Jan. 5, 1937.　　T. E. D. BILDE ET AL　　2,066,669
CASH REGISTER
Original Filed Feb. 28, 1929　　4 Sheets-Sheet 1
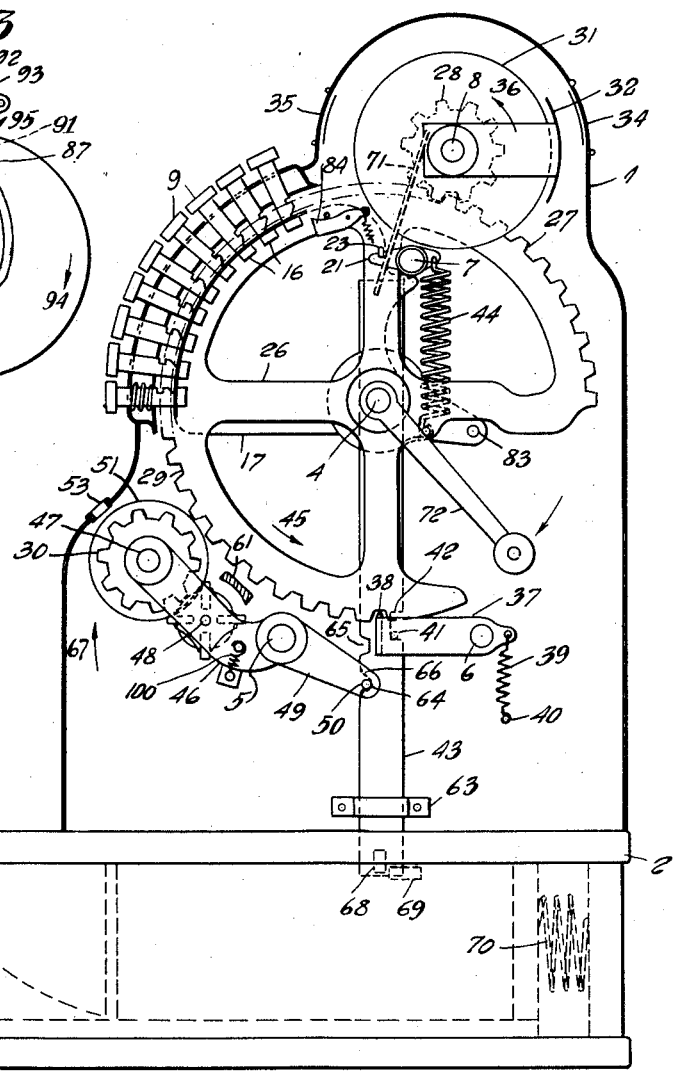
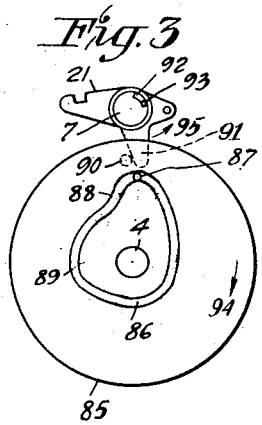
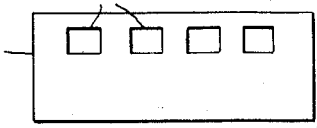
INVENTORS
Tord Erik Daniel Bilde
Peter Eric Lindvall
BY
their ATTORNEY Jan. 5, 1937.  T. E. D. BILDE ET AL  2,066,669
CASH REGISTER
Original Filed Feb. 28, 1929    4 Sheets-Sheet 2
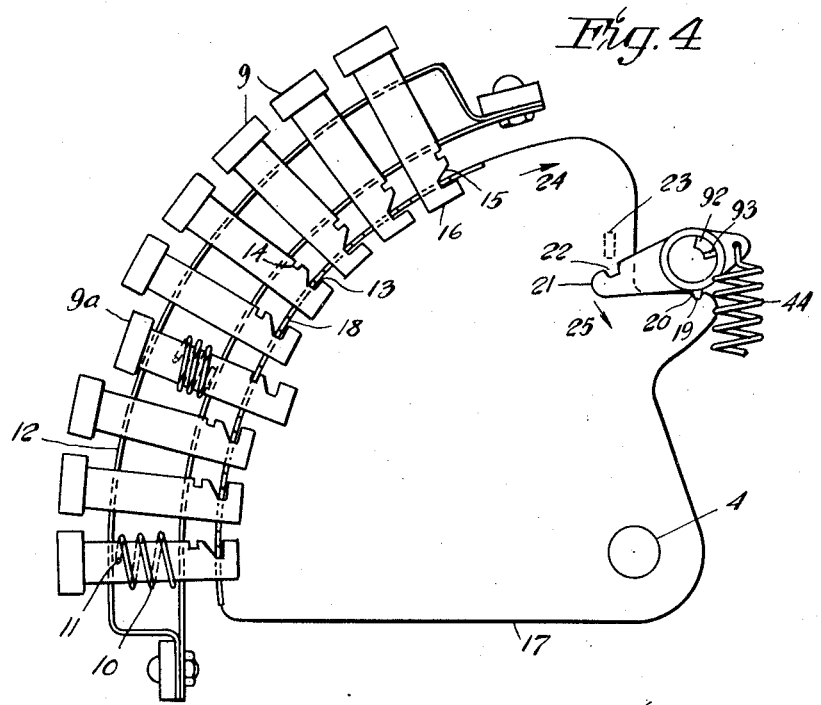
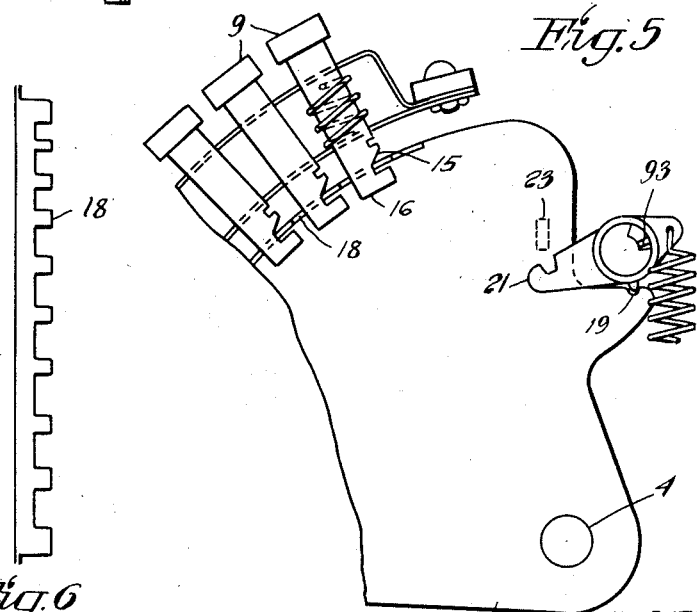

Jan. 5, 1937. T. E. D. BILDE ET AL 2,066,669
CASH REGISTER
Original Filed Feb. 28, 1929  4 Sheets-Sheet 3
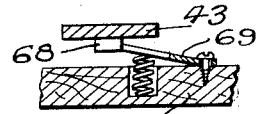
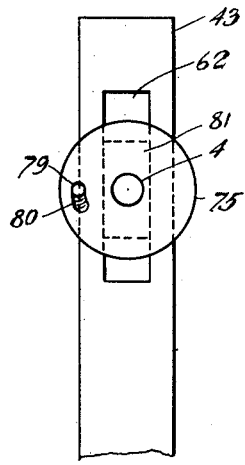
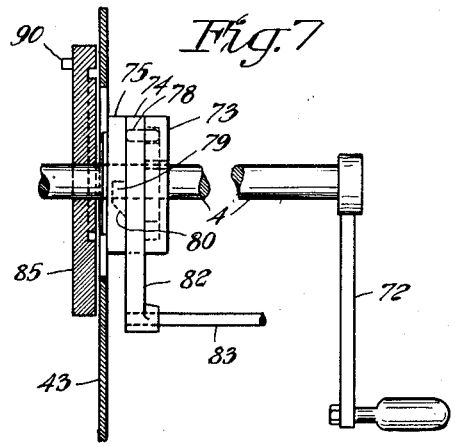
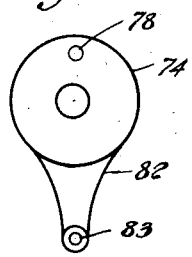
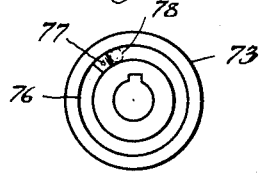
INVENTORS
BY
ATTORNEY Jan. 5, 1937.     T. E. D. BILDE ET AL     2,066,669
CASH REGISTER
Original Filed Feb. 28, 1929    4 Sheets-Sheet 4
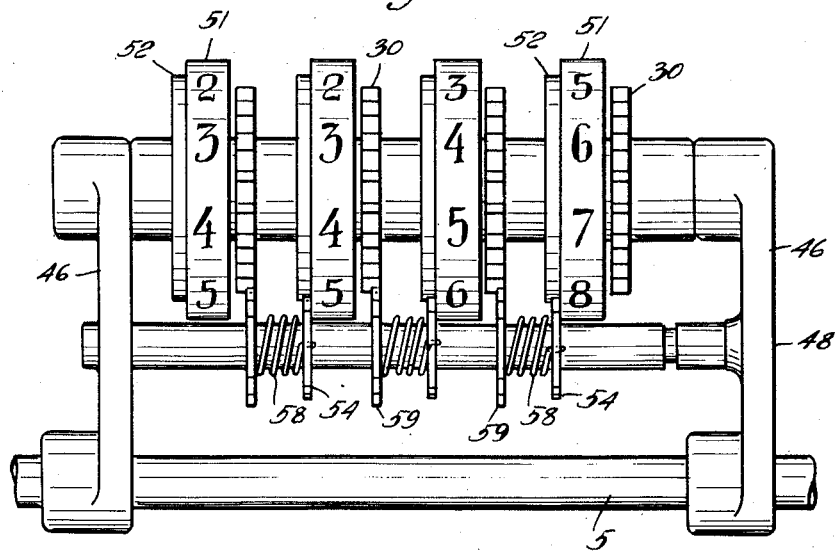
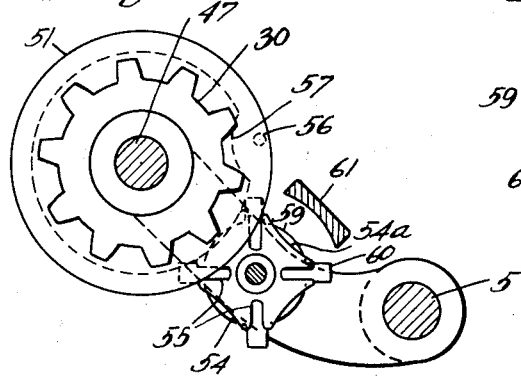
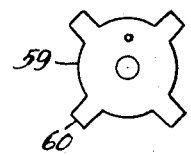

Patented Jan. 5, 1937

2,066,669

UNITED STATES PATENT OFFICE 2,066,669

CASH REGISTER

Tord Erik Daniel Bilde and Sten Eric Lindvall, Stockholm, Sweden

Original application February 28, 1929, Serial No. 343,512. Divided and this application May 31, 1930, Serial No. 457,800. In Sweden March 1, 1928

5 Claims. (Cl. 235—9)

This application is a division of our copending application, U. S. Serial No. 343,512, filed February 28, 1929.

This invention relates to cash registers and more particularly to cash registers which include actuating, totalizing, indicating and printing devices and which are operated by setting keys and an operating shaft.

The object of the invention is to provide a cash register of simple construction and easy of manipulation.

One feature of the invention is to provide a cash register, in which the actuating members are adapted directly, without the aid of intermediate parts, to operate the totalizing and indicating devices and, if provided, also printing devices.

According to a further feature of the invention the actuating members are locked in their zero position by releasable locking members. These locking members are operated by the setting keys when the latter are pressed down.

Further characteristic features of the invention will be apparent from the following description of a preferred embodiment of the invention which by way of example is diagrammatically illustrated on the accompanying drawings, in which—

Fig. 1 is a side view in section of the cash register.

Fig. 2 is a plan view of a shrouding device.

Fig. 3 is an end view of a disk to operate zero stop members and a locking bar.

Fig. 4 shows the setting keys and a locking segment.

Fig. 5 is a fragmentary view of the parts shown in Fig. 4 but in a different position.

Fig. 6 shows the toothed edge of the locking segment shown in Fig. 4.

Fig. 7 shows an operating shaft with a clutch device and the disk shown in Fig. 3.

Figs. 8, 9, 10 show details of the clutch device shown in Fig. 7.

Figs. 11, 12, 13 and 14 show details of the totalizer mechanism.

Figs. 15 and 16 show details on an enlarged scale of other parts of the cash register.

Referring to Fig. 1, the cash register proper is mounted in a housing 1, which is fixed on a wooden casing 2, containing the cash drawer 3. In upright side plates (not shown) are journalled the operating shaft 4, the shaft 5 supporting the totalizer device, the shaft 6 supporting a locking device common for all actuating means, the shaft 7 supporting the zero stop members and the shaft 8 supporting the indicating disks.

Through openings in the housing 1 are inserted the setting keys 9 which are provided with springs 10, Fig. 4, which tend to press the keys outwardly, the keys being provided with pins 11 which abut against a plate 12. The keys are provided with notches 13 and 14 of different depths, a sloping surface 15 being provided between the two notches and the innermost portion 16 of the keys serving as abutment for the actuating means in the manner to be described later on.

Rotatably mounted on the operating shaft 4 are locking segments 17, one for each actuating member and thus for each series of keys. These segments are at their edges provided with teeth which cooperate with the notches and the sloping surface on the keys. Normally the segments rest with their teeth in the deeper notches 13. When pressing down a key such as 9a the segment 17 is rotated about the shaft 4 on account of a tooth 18 sliding along the sloping surface 15 and finally the tooth will snap into the notch 14 of lesser depth, thereby holding the segment 17 in a certain position and at the same time the key 9a will be locked in its pressed down position.

Each segment is further provided with a notch 19, in which engages a projection 20 on zero stop members 21, mounted on the shaft 7. The zero stop members are provided with a notch 22 which engages with a projection 23 on actuating members 26, the normal position of the parts being shown in Fig. 1. It will be clear that when a key 9a is pressed down, the segment 17 will be rotated in the direction of the arrow 24, whereby the notch 19 engages the projection 20 on the zero stop member 21 and rotates the latter in the direction of the arrow 25 around the shaft 7 thus releasing the notch 22 from engagement with the projection 23 on the actuating members.

The actuating members 26 consist of toothed wheels, a quarter of the circumference being cut away. The teeth 27 are in constant engagement with a toothed wheel 28 on the indicating members, while the teeth 29 are adapted to be brought into and out of engagement with toothed wheels 30 on the totalizing device.

Between each zero stop member 21 and each actuating member 26 is provided a spring 44 which tends to move the zero stop member in a direction opposite to the arrow 25 and the segment 17 in a direction opposite to the arrow 24 and further tends to rotate the actuating members in the direction of the arrow 45.

The indicating means consist of figure drums 31, each of which is securely connected with the toothed wheel 28. The drums with the toothed wheels are rotatably mounted on the shaft 8. On the same shaft is further loosely mounted a shrouding device 32 provided with openings 33 (Fig. 2) and in the housing 1 are arranged windows 34 and 35 respectively through which the figures on the drums can be observed. Normally the shrouding device 32 is in such a position (Fig. 1), that the openings 33 in the same register with the window 34. When the shrouding device 32 is moved upwardly in the direction of the arrow 36, the solid lower part of the same will cover the figures on the drums 31.

On the shaft 6 is rotatably mounted a locking member 37 provided with a locking bar 38, which engages the teeth 29 of all the actuating members 26. The member 37 is normally kept in engagement with the teeth 29 by means of a spring 39 secured to one end of the member 37 and to a fixed point 40 on the upright plates (not shown). The member 37 is further provided with a pin 41, which extends into a recess 42 in an operating bar 43 to be described later on.

The totalizing device consists of the following parts: On the shaft 5 are rotatably mounted two arms 46 between which are arranged a shaft 47 and a shaft 48. On one of the arms 46 is further securely fastened an arm 49 extending from the shaft 5 in opposite direction to the arms 46. At the extreme end of the arm 49 is fitted a spring-actuated pin 50 (see Fig. 14), which is adapted to cooperate with notches on the operating bar 43 in a manner to be described later on. On the shaft 47 are rotatably mounted toothed wheels 30 rigidly attached to numeral wheels 51, the latter being provided with a circular sliding surface 52 (Figs. 11, 12 and 13). The figures on the numeral wheels are made visible through windows 53 in the housing 1 (Fig. 1). On the shaft 48 are rotatably mounted disks 54. These disks are provided with notches 55 which cooperate with pins 56 on the numeral wheels 51. The circular sliding surface 52 is provided with a recess 57 opposite to the pin 56. One end of a spiral spring 58 surrounding shaft 48 is fixed to the disk 54 the other end being secured to a carrier disk 59 of a shape as clearly shown in Fig. 13. These carrier disks 59 are also rotatably mounted on the shaft 48 and are provided at their periphery with four projections 60 which under certain conditions cooperate with the teeth of the toothed wheels 30. Between the arms 46 and the teeth 29 of the actuating members 26 is arranged a locking bar 61 fixed to the upright plates (not shown) and which engages with the projection 60 on the disks 59, when the totalizer has been rotated about the shaft 5, so as to bring the toothed wheels 30 into engagement with the teeth 29.

The operating bar 43 is provided with a slot 62 surrounding the shaft 4 so that by this means the upper end of the operating bar 43 is properly guided. At the lower end the operating bar 43 is guided by suitable members 63 attached to the upright plates (not shown). Approximately opposite to the recess 42 the operating bar is provided with two recesses 64 and 65, a sloping surface 66 being arranged between the two recesses. When the operating bar 43 is moved downwardly in a manner to be described later on, the pin 50 on the arm 49 rides on the sloping surface 66, thereby rotating the totalizing device in the direction of the arrow 67 around the shaft 5, thereby bringing the toothed wheels 30 into engagement with the teeth 29. This is carried out immediately before the locking bar 38 is removed from the teeth 29 by the upper edge of the recess 42 and also before the actuating means 26 are rotated. After the actuating means have been rotated and thus also the totalizer wheels 51, the operating bar 43 is further moved downwardly, so that the pin 50 drops down into the next recess 65, whereby the totalizer is moved away by its own weight or by spring means indicated at 100 from the teeth 29 in the direction opposite to the arrow 67. Upon the return stroke of the operating bar 43 the spring-actuated pin 50 slides over the flat surface of the operating bar 43 from the recess 65 to the recess 64 without bringing the toothed wheels 30 into engagement with the teeth 29.

At the extreme lowest end of the operating bar 43 is fixed a stop 68, which is arranged in the path of a spring-actuated catch member 69 attached to the cash drawer 3 (see Fig. 15). Between the cash drawer 3 and the wooden casing 2 is arranged a spring 70 which tends to push the cash drawer 3 outwardly. When the operating bar 43 is moved downwardly the stop 68 moves past the lower edge of the catch member 69, thereby disengaging the latter and allowing the cash drawer 3 to move outwardly. When the cash drawer is pushed in again and the operating bar 43 is in its upper position, as shown in Fig. 1, the catch member 69, on account of its spring, is deflected by and snaps over the stop 68.

At the upper end of the operating bar 43 is attached a link 71 connecting the operating bar with the shrouding device 32. It is obvious that when the operating bar 43 is moved downwardly, the shrouding device 32 will be rotated in the direction of the arrow 36.

To operate the actuating means 26 the following mechanism is provided:

On the shaft 4 is fixed a handle 72. It is of course understood that instead of the handle a motor or other power device may be geared to the shaft 4. On the shaft 4 is further mounted a clutch device consisting of three disks 73, 74 and 75. The disk 73 is securely fixed to the shaft 4 and provided at the side adjacent the disk 74 with a circular groove 76, in which is fitted a member 77 having a sloping surface on one side thereof. The disk 74 is rotatably mounted on the shaft 4 and provided with an opening passing entirely through the material of the disk. In this opening is slidably arranged a pin 78 of greater length than the thickness of the disk 74 and of such a length that the projecting portion thereof may freely slide in the groove 76 in the disk 73. The third disk 75 is provided with a hole 79 with a sloping surface 80. This disk 75 has a central opening, in which the shaft 4 may freely rotate. On the side opposite to the disk 74, the disk 75 is provided with a rectangular member 81, which is arranged in the longitudinal slot 62 of the operating bar 43, so that by this means the disk 75 is prevented from rotating about the shaft 4, at the same time allowing the operating bar 43 to be moved up and down in being guided by the member 81. The disk 74 has an extension 82 which is provided with a zeroizing bail 83, extending across all the actuating members 26 and parallel with the shaft 4. In rotating the shaft 4, the disk 73 will carry along the disk 74 by means of its member 77 in the groove 76 and the pin 78, the sloping surface on the member 77 always tending to push the pin 78 in the direction toward the disk 75. As soon as, during the rotation of the disk 73 together with the disk 74, the pin 78 registers with the hole 79 in the disk 75, the pin 78 will be pushed into this hole thus releasing the disk 73 from engagement with the disk 74. The disk 73 may then together with the shaft 4 rotate further, while the disk 74 is stopped because the pin 78 connects the disk 74 with the disk 75 which latter is prevented from rotating. The member 77 in the groove 76, the opening in the disk 74 containing the pin 78 and the hole 79 in the disk 75 are arranged in such relation to each other, that the shaft 4 and thus the disk 73 is rotated about a quarter of revolution, at which moment the pin 78 will register with the hole 79. During this quarter of revolution the zeroizing bail 83 has carried along with it all actuating members 26 which may have been out of zero position and during this movement of the actuating means the springs 44 will be put under greater tension, so that as soon as the disk 73 is released from engagement with the disk 74 by means of the pin 78, the actuating means will by the action of the springs 44 act against the zeroizing bail 83 and thereby rotate the disk 74 in opposite direction to which it has been rotated by the rotation of the shaft 4. When the zeroizing bail is moving the actuating means 26 in the direction opposite to the arrow 45 (Fig. 1) into zero position all those actuating means 26, for which no key 9 has been pressed down, will be caught by the zero stop member 21 and kept in the zero position, while other actuating members for which a key, for instance 9a, has been pressed down, will return from the zero position and abut by means of a stop member 84 on the actuating means against the key pressed down, thereby also carrying along the zeroizing bail 83. The stop member 84, which is shown on an enlarged scale in Fig. 16, is spring-actuated, so that, when the actuating means during the following registering operation are moved by the zeroizing bail, it can snap over a newly set key 9.

From this it will be seen, that the indicating wheels 31 will be set into the proper position, when the actuating members 26 are rotated by their springs 44 from the zero position into the position determined by the said key. The totalizer, however, will act in a different manner, that is to say, the previous registration will be registered on the totalizer wheels, when the zeroizing bail 83 is moving the actuating members 26 from the position previously set into zero position. As soon as the actuating members 26 have reached their zero position, the operating bar 43 has been moved down so much, that the pin 50 on the support 49, 46 will move from the sloping surface 66 into the recess 65. The totalizer therefore registers only all the amounts, with the exception of the very last registration, which, however, for instance at the end of the day, may also be registered on the totalizer by rotating once more the shaft 4 one revolution.

The operating bar 43 is operated in the following manner: On the shaft 4 is securely fixed a disk 85 provided with a curved groove 86 (Figs. 3 and 7), in which slides a pin 87 on the operating bar 43. When the shaft 4 is rotated, the pin 87 will slide from its radially outermost position in the groove 86 to the next step 88, which is sufficient to move the pin 50 on the totalizer support out of the recess 64 onto the sloping surface 66. The curved groove is slowly approaching the center of the disk 85, thereby allowing the operating bar 43 to be moved further down, which is required to let the upper edge of the recess 42 abut against the pin 41 on the locking bar 37, 38, thus releasing the actuating members 26. The next step 89 is provided for allowing the pin 50 on the totalizer device to drop into the recess 65, to move the shrouding device 32 into obscuring position and also to allow the stop member 69 on the cash drawer to pass the stop 68 on the operating bar 43. During the other half revolution of the shaft 4 the pin 87 gradually is lifted up again, thereby lifting the operating bar 43 with the results above mentioned.

Before the shaft 4 has reached its normal zero position, it will be necessary to release all locking segments 17 from engagement with the set keys 9a. This is obtained in the following manner:—On the disk 85 (Figs. 3 and 7) is fitted a pin 90. This pin is adapted to cooperate with an arm 91 securely fixed to the shaft 7. In this shaft 7 is cut a longitudinal groove 92 limited in circumferential direction. Each zero stop member is provided with a pin 93 extending into said grove 92. Fig. 3 shows the position of the parts just before shaft 4 and thus disk 85 have reached their initial position. On turning the disk 85 the last part of revolution in the direction of the arrow 94, the pin 90 will rotate the shaft 7 by means of the arm 91 in the direction of the arrow 95. By this means the lower edge on the recess 92 in the shaft 7 will engage the pins 93 on the zero stop members and move the same into the position shown in Fig. 5. The zero members 21 will thereby, by means of their projections 20, rotate the segments 17 further in the direction of the arrow 24 (Fig. 4), so that the teeth 18 on the segment 17 will leave the notches 14 in the keys 9, so that the latter by means of their springs 10 are pressed outwardly. On further movement of the disk 85 the pin 90 will move past the arm 91, so that the zero stop members 21 are rotated in the direction opposite to the arrow 95 by the action of their springs 44. By this movement the locking segments 17 are also moved in the direction opposite to the arrow 24 and the teeth 18 thereon will now be situated in the deeper notches 13 on the keys 9, as shown in Fig. 1.

On one end of shaft 4 printing wheels (not shown) may be rotatably mounted, which in such a case are to be connected with their respective actuating members 26 by means of sleeves.

The shaft 4 will further be provided with a ratchet or the like device (not shown) which will prevent a rotation of the shaft in opposite direction.

The operation of the cash register and the transfer of a decimal on the totalizer is as follows, assuming at first that all of the actuating members 26 are in the zero position shown in Fig. 1:—

In pressing down a key 9 as a first operation, the corresponding locking segment 17 is turned a fraction of a revolution in the direction of the arrow 24, whereby the corresponding zero stop member 21 is rotated a little amount in the direction of the arrow 25, thus releasing this zero stop member from engagement with the projection 23 on the corresponding actuating member 26. This member 26 thus released is however locked by the common locking bar 38. As a second operation the shaft 4 is turned one revolution in a clockwise direction as seen in Fig. 1. During the rotation of the shaft 4, the operating bar 43 is moved downwardly and again upwardly by means of the pin and groove engagement between said bar and the disk 85. When moving downwardly the operating bar 43 first brings the totalizer into engagement with the actuating members, and then the locking member 38 is disengaged from the actuating members. When this is effected, the zeroizing bail 83 is rotated approximately one quarter turn in a clockwise direction by means of the releasable clutch device 73—35. However, due to the fact that the actuating members 26 are already in zero position, bail 83 has no effect on them (except to return to zero position any of the actuating members which may have started to rotate in a counter-clockwise direction under the influence of springs 44 after the release of locking member 38). Consequently, nothing is registered in the totalizer. At the moment said zero position has been reached by the bail 83, the operating bar 43 has been moved downwardly so much, that the totalizer is again disengaged from the actuating members. At the same time the shrouding device has been moved from open position to closed position. Simultaneously with reaching said zero position the clutch device is released and the actuating members are free to rotate in counter-clockwise direction by the action of their springs 44 into the new set position determined by the set key. In this movement the indicating wheels 31 partake, so that the amount set will be shown on said wheels. At the upward movement of the operating bar 43 the shrouding device is again lowered from closed position to open position. The actuating members 26 are locked in their set positions, as determined by set keys 9a, and the items are not at this time registered in the totalizer. This locking is effected by locking member 38 which is brought into engagement with the actuating members because of the upward movement of operating bar 43. The set keys 9a are released from engagement of their notches 14 with locking segments 17 by a slight rotation of the latter in the direction of the arrow 24 (Fig. 4). This slight rotation is caused by pin 90 on disk 85 of the clutch striking arm 91 and thereby rotating shaft 7 and projection 20, as previously described. The keys 9a are then snapped outwardly by their respective springs 10 and the segments 17 move back into engagement with notches 13 when the pin 90 has passed arm 91.

The machine is now ready to record another transaction and this is done by the operator in the same manner as just described. The internal operation of the mechanism is also the same, with the exception that, the actuating members 26 being still in the positions where they were set during the previous operation, they are returned to zero against the action of their respective springs 44 by the rotation in clockwise direction of zeroizing bail 83 after locking member 38 has been disengaged. Due to the fact that the totalizer is held in engagement with the actuating members during their rotation by bail 83, as above explained, the items set during the preceding operation are transferred to the totalizer. Thereafter, the mechanism operates to set up the new items in the same manner as hereinbefore described.

If it is desired to transfer the last transaction into the totalizer, as for instance at the end of each day, this may be done by turning the handle 72 in the usual manner, but without any of the keys 9 having been set.

Tens transfer within the totalizer takes place as follows after the totalizer is disengaged from actuating members 26. In case the numeral wheel 51 located on the extreme right in Fig. 13 has passed from 9 to zero or further, pin 56 enters one of the notches 55 in disk 54 and turns the latter a quarter of a revolution. This is made possible on account of recess 57 formed in sliding surface 52. After the disk 54 has been turned and the spring 58 thereby tensioned the concave edge 54a next to the notch of the disk 54 will allow sliding of the surface 52 thereon on further movement of the latter. When the totalizer is in engagement with the actuating member 26 the spring 58 is unable to turn the disk 59 as this is locked by the bar 61 and cannot be rotated by the toothed wheel 30 second from right. When, however, the totalizer is disengaged, the disk 59 will be removed from the bar 61, and the spring 58 due to its tension, set up on rotation of the disk 54, will force the disk 59 to rotate a quarter of a revolution in a counter clockwise direction, whereby one of the projections 60 engages with one of the teeth of the second toothed wheel 30 from the right and turns the same one step.

What we claim is:—

1. A cash register comprising setting key means, actuating means, an operating shaft, and a clutch device on said shaft and operative by rotation of said shaft, said clutch device being periodically operatively connected with said actuating means when said shaft is operated.

2. In a cash register, spring actuated actuating means, an operating shaft, means for rotating said shaft a complete revolution in one direction, a clutch device on said shaft, said clutch device comprising a disk member fixed to said shaft, a second disk member rotatably mounted on said shaft and provided with a zeroizing bail to move said actuating means into zero position when operating said shaft, and means for periodically connecting said disks with each other during one revolution of said shaft.

3. In a cash register, spring actuated actuating means, an operating shaft, means for rotating said shaft a complete revolution in one direction, a clutch device on said shaft, said clutch device comprising a disk member fixed to said shaft, a second disk member rotatably mounted on said shaft and provided with a zeroizing bail to move said actuating means into zero position when operating said shaft, said first named disk member provided with an annular groove, a stop member in said groove extending a fractional portion only of the circumference of said groove and having an inclined surface, a bore hole in said second disk member, a third disk member loosely mounted on said shaft and provided with a recess having an inclined surface, means to prevent said third disk member from rotating, and a pin of greater length than the thickness of said second disk member inserted in the bore hole of the latter, the projecting end of said pin engaging alternately, during one revolution of said shaft, with said groove and the stop member therein and with the recess in said third disk member.

4. A cash register comprising toothed wheel actuating members, locking means for preventing movement of said actuating members, a pivotally mounted totalizer comprising toothed wheels engageable with said actuating members, an operating shaft, a reciprocably mounted member, means for reciprocating said member by rotation of said shaft, means responsive to movement of said member for engaging said totalizer with said actuating members, and means responsive to further movement of said member for releasing said locking means.

5. In a cash register, spring actuated actuating means, an operating shaft, means for rotating said shaft a complete revolution in one direction, a zeroizing bail mounted to rotate about the axis of said shaft for moving said actuating means to zero position, and means for connecting said bail to said shaft for a portion only of each revolution of the shaft to cause the bail to rotate with the shaft during such portion.

TORD ERIK DANIEL BILDE.
STEN ERIC LINDVALL.